US012233377B2

(12) United States Patent
Maehara et al.

(10) Patent No.: US 12,233,377 B2
(45) Date of Patent: Feb. 25, 2025

(54) HYDROGEN GAS SUPPLY APPARATUS AND HYDROGEN GAS SUPPLY METHOD

(71) Applicant: ENEOS CORPORATION, Tokyo (JP)

(72) Inventors: Kazumi Maehara, Tokyo (JP); Daisaku Tateishi, Tokyo (JP); Motoyoshi Fukuoka, Tokyo (JP); Tadashi Seike, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 699 days.

(21) Appl. No.: 17/441,499

(22) PCT Filed: Mar. 24, 2020

(86) PCT No.: PCT/JP2020/012942
§ 371 (c)(1),
(2) Date: Sep. 21, 2021

(87) PCT Pub. No.: WO2020/196491
PCT Pub. Date: Oct. 1, 2020

(65) Prior Publication Data
US 2022/0161183 A1 May 26, 2022

(30) Foreign Application Priority Data
Mar. 27, 2019 (JP) ................. 2019-061869

(51) Int. Cl.
B01D 53/04 (2006.01)
B01J 20/28 (2006.01)
(Continued)

(52) U.S. Cl.
CPC ..... B01D 53/0423 (2013.01); B01D 53/0446 (2013.01); B01D 53/0454 (2013.01);
(Continued)

(58) Field of Classification Search
CPC ............ B01D 53/0423; B01D 53/0446; B01D 53/0454; B01D 2256/16;
(Continued)

(56) References Cited

U.S. PATENT DOCUMENTS 3,101,261 A    4/1963   Skarstrom
2006/0130402 A1 6/2006  Wheat et al.
2014/0332114 A1 11/2014 Nagara et al.

FOREIGN PATENT DOCUMENTS

CN    103998851 A    8/2014
EP    0 489 555      6/1992
(Continued)

OTHER PUBLICATIONS

Office Action issued in JP Patent Application No. 2021-509439, Apr. 16, 2024, translation.

(Continued)

Primary Examiner — Robert Clemente
(74) Attorney, Agent, or Firm — Greenblum & Bernstein, P.L.C.

(57) ABSTRACT

A hydrogen gas supply apparatus includes a compressor configured to compress hydrogen gas and supply the compressed hydrogen gas toward a pressure accumulator which accumulates the hydrogen gas, a first adsorption column disposed between the discharge port of the compressor and the pressure accumulator and configured to include the first adsorbent for adsorbing impurities in the hydrogen gas discharged from the compressor, a first valve disposed between the discharge port of the compressor and the gas inlet port of the first adsorption column, a second valve disposed between the gas outlet port of the first adsorption column and the pressure accumulator, a return pipe configured to branch from between the first valve and the gas inlet port of the adsorption column and connect to the suction side (Continued)

of the compressor, and a second adsorption column disposed in the middle of the return pipe.

11 Claims, 9 Drawing Sheets

(51) Int. Cl.
  *B01J 20/34* (2006.01)
  *C01B 3/56* (2006.01)
  *F17C 5/06* (2006.01)
(52) U.S. Cl.
  CPC ..... *B01J 20/28052* (2013.01); *B01J 20/3491* (2013.01); *C01B 3/56* (2013.01); *F17C 5/06* (2013.01); *B01D 2256/16* (2013.01); *B01D 2257/20* (2013.01); *B01D 2257/30* (2013.01); *B01D 2259/40003* (2013.01); *B01D 2259/402* (2013.01); *C01B 2203/043* (2013.01); *C01B 2203/0485* (2013.01); *F17C 2205/0323* (2013.01); *F17C 2205/0352* (2013.01); *F17C 2221/012* (2013.01); *F17C 2227/0135* (2013.01); *F17C 2265/065* (2013.01); *F17C 2270/0168* (2013.01)
(58) Field of Classification Search
  CPC .... B01D 2259/40003; B01D 2259/402; C01B 3/56; C01B 2203/043; C01B 2203/0485; F17C 2205/0323; F17C 2205/0352; F17C 2221/0012; F17C 2227/0135; F17C 2265/065
  See application file for complete search history.

(56) References Cited

FOREIGN PATENT DOCUMENTS

| | | |
|---|---|---|
| JP | 2006-283886 A | 10/2006 |
| JP | 2007-82952 | 4/2007 |
| JP | 2008-273802 | 11/2008 |
| JP | 2009-154079 | 7/2009 |
| JP | 2011-167629 | 9/2011 |
| JP | 2015-112545 A | 6/2015 |
| JP | 2017-160084 A | 9/2017 |
| JP | 2018-62991 | 4/2018 |
| JP | 2018-84328 | 5/2018 |
| JP | 2018-084328 A | 5/2018 |
| JP | 2018-84329 | 5/2018 |
| WO | 2010/134472 A1 | 11/2010 |

OTHER PUBLICATIONS

EESR issued in EP Patent Application No. 20778470.3, Nov. 2, 2022.

Shivaji Sircar et al., "Pressure Swing Adsorption Technology for Hydrogen Production and Purification Technologies", Dec. 14, 2009, John Wiley & Sons, Inc., Hoboken NJ, USA, XP055115403, ISBN: 978-0-47-171975-5, pp. 414-450, DOI: 10 1002/9780470561256.ch10.

Office Action issued in CN Patent Application No. 202080024858.5, Mar. 1, 2023, translation.

ISR issued in WIPO Patent Application No. PCT/JP2020/012942, Jun. 9, 2020, English translation.

IPRP issued in WIPO Patent Application No. PCT/JP2020/012942, Sep. 28, 2021, English translation.

HYDROGEN GAS SUPPLY APPARATUS AND HYDROGEN GAS SUPPLY METHOD

TECHNICAL FIELD

This application is based upon and claims the benefit of priority from Japanese Patent Application No. 2019-061869 filed on Mar. 27, 2019 in Japan, the contents of which are incorporated herein.

The present invention relates to a hydrogen gas supply apparatus and a hydrogen gas supply method, and, for example, to a hydrogen gas supply apparatus and hydrogen gas supply method arranged at a hydrogen station.

BACKGROUND ART

As fuel for vehicles, in addition to conventional fuel oils such as gasoline, hydrogen gas has recently attracted attention as a clean energy source. Correspondingly, fuel cell vehicles (FCVs) powered by the hydrogen gas have been developed. As hydrogen stations for FCVs, there are a hydrogen production base such as a hydrogen shipping center and an on-site hydrogen station (hereafter referred to as an on-site ST), and an off-site hydrogen station (hereafter referred to as an off-site ST) which receives and sells hydrogen from the hydrogen production base (hydrogen shipping center, on-site ST, etc.). Hydrogen gas is produced by an HPU (Hydrogen Product Unit), etc. At hydrogen stations, in order to rapidly fill FCVs with hydrogen gas, there are disposed a compressor for compressing hydrogen gas to a high pressure, and a plurality of pressure accumulators (multi-stage accumulator) for accumulating the hydrogen gas compressed to a high pressure by the compressor. In such hydrogen stations, hydrogen gas is rapidly charged from the pressure accumulator into the fuel tank by performing filling while suitably switching the pressure accumulator to be used such that the differential pressure between the pressure inside the pressure accumulator and the pressure in the fuel tank of the FCV is maintained large.

Here, there has been a problem that, in compressing the hydrogen gas having been refined to high purity as a fuel for FCV by a compressor, impurities such as sulfur, halogen generated from component parts and the like of the compressor mix with the hydrogen gas, thereby making the quality of the hydrogen gas out of specification. In response to this problem, it is now examined to dispose an adsorption column, with an adsorbent arranged, at the downstream side of the compressor and to remove the impurities. However, it has been a problem that since the operation of the compressor is stopped after a specified amount of hydrogen has been charged into the pressure accumulator, the inside of the compressor is depressurized down to the pressure at the suction side, and thus the impurities having been adsorbed by the adsorbent desorb and diffuse toward the compressor side (the first side). Further, it is desirable not to waste hydrogen gas as much as possible.

There is here disclosed a method for making impurities adsorbed on an adsorbent in the process of hydrogen production (e.g., refer to Patent Literature 1).

CITATION LIST

Patent Literature

Patent Literature 1: JP-A-2011-167629

SUMMARY OF INVENTION

Technical Problem

One aspect of the present invention provides an apparatus and method capable of efficiently using hydrogen gas while inhibiting impurities of the hydrogen gas adsorbed by an adsorbent disposed at the downstream side of the compressor from diffusing to the compressor side.

Solution to Problem

According to one aspect of the present invention, a hydrogen gas supply apparatus includes
a compressor configured to compress hydrogen gas;
a pressure accumulator configured to accumulate the hydrogen gas compressed by the compressor;
a first adsorption column disposed between the compressor and the pressure accumulator, and configured to include a first adsorbent which adsorbs impurities mixed in the hydrogen gas discharged from the compressor;
a first valve disposed in a first gas supply pipe between the compressor and the first adsorption column;
a second valve disposed in a second gas supply pipe between the first adsorption column and the pressure accumulator;
a return pipe configured to branch from the first gas supply pipe between the first valve and the first adsorption column and connect to an upstream side of the compressor;
a second adsorption column disposed at the return pipe and configured to include a second adsorbent which adsorbs the impurities;
a third valve disposed at an upstream side of the second adsorption column at the return pipe; and
a control apparatus configured to control opening and closing of the first valve, the second valve, and the third valve.

Further, it is preferable that the control apparatus controls to open the third valve in a state where the first valve and the second valve are controlled to be closed, while an operation of the compressor is stopped.

Further, it is preferable to further include a vent line configured to branch from the first gas supply pipe between the first valve and the first adsorption column, and a fourth valve disposed in the vent line, wherein the control apparatus controls, in a state where the first valve and the second valve are controlled to be closed, to open the third valve and the fourth valve.

Further, it is preferable to further include a hydrogen production apparatus configured to supply the hydrogen gas to the compressor, wherein the control apparatus controls to close the third valve, open the first valve, and supply the hydrogen gas, supplied from the hydrogen production apparatus through the compressor being stopped, to the first adsorption column after a predetermined time has elapsed since the fourth valve was opened.

Further, it is preferable that the adsorbent has an adsorption capacity for sulfur and halogen.

According to another aspect of the present invention, a hydrogen gas supply method includes
compressing hydrogen gas by a compressor;
accumulating the hydrogen gas compressed by the compressor in a pressure accumulator;
adsorbing impurities mixed in the hydrogen gas discharged from the compressor, to a first absorbent by using a first adsorption column which is disposed between the compressor and the pressure accumulator and includes the first adsorbent; and absorbing, in a state where a first valve disposed in a first gas supply pipe between the compressor and the first adsorption column, and a second valve disposed in a second gas supply pipe between the first adsorption column and the pressure accumulator are controlled to be closed, the impurities to a second adsorbent by using a second adsorption column which is disposed at a return pipe and includes the second adsorbent, by controlling to open a third valve disposed at the return pipe which branches from the first gas supply pipe between the first valve and the first adsorption column and connects to an upstream side of the compressor.

According to yet another aspect of the present invention, a hydrogen gas supply apparatus includes a compressor configured to compress hydrogen gas, and supply the hydrogen gas compressed to a side of a pressure accumulator which accumulates the hydrogen gas;

a first adsorption column disposed between a discharge port of the compressor and the pressure accumulator, and configured to include a first adsorbent for adsorbing impurities in the hydrogen gas discharged from the compressor;

a first valve disposed between the discharge port of the compressor and a gas inlet port of the first adsorption column;

a second valve disposed between a gas outlet port of the first adsorption column and the pressure accumulator;

a return pipe configured to branch from between the first valve and the gas inlet port of the adsorption column and connect to a suction side of the compressor;

a second adsorption column disposed in a middle of the return pipe and configured to include a second adsorbent for adsorbing the impurities in the hydrogen gas discharged from the compressor; and a third valve disposed at between the gas inlet port of the first adsorption column and a gas inlet port of the second adsorption column, being at the middle of the return pipe.

Further, it is preferable that compressed hydrogen gas in the first adsorption column is flowed into the return pipe due to opening the third valve, and impurities desorbed from the first adsorbent are adsorbed by the second adsorbent in a state where the first adsorption column is blocked from the compressor by the first valve.

Further, it is preferable to further include a vent line configured to branch between the first valve and the gas inlet port of the first adsorption column, and a fourth valve disposed in a middle of the vent line, wherein an inside of the first adsorption column is depressurized from a high pressure to a low pressure, and impurities desorbed from the first adsorbent are discharged to the vent line due to opening the fourth valve.

Further, it is preferable that the hydrogen gas is supplied to the compressor from a hydrogen production apparatus, and the hydrogen gas supplied from the hydrogen production apparatus through the compressor being stopped is introduced as a purge gas to the first adsorption column due to opening the first valve and the fourth valve in a state where the compressor is stopped and the inside of the first adsorption column has been depressurized to the low pressure.

Further, it is preferable that the impurities are those having been mixed in the compressor.

According to yet another aspect of the present invention, a hydrogen gas supply method includes compressing hydrogen gas by a compressor, and supplying the hydrogen gas compressed to a side of a pressure accumulator which accumulates the hydrogen gas;

adsorbing impurities in the hydrogen gas discharged from the compressor to a first absorbent by using a first adsorption column which is disposed between a discharge port of the compressor and the pressure accumulator for accumulating the hydrogen gas and includes the first adsorbent; and adsorbing, by flowing compressed hydrogen gas in the first adsorption column to a return pipe which branches at a gas inlet side of the first adsorption column, being at a discharge side of the compressor, and which connects to a suction side of the compressor in a state where the first adsorption column is blocked from the compressor, the impurities desorbed from the first adsorbent to a second absorbent by using a second adsorption column disposed in a middle of the return pipe.

Advantageous Effects of Invention

According to one aspect of the present invention, it is possible to efficiently use hydrogen gas remaining in an adsorption column while inhibiting impurities of the hydrogen gas adsorbed by an adsorbent disposed at the downstream side of the compressor from diffusing to the compressor side.

DESCRIPTION OF EMBODIMENTS

Embodiment 1

Figure 1:
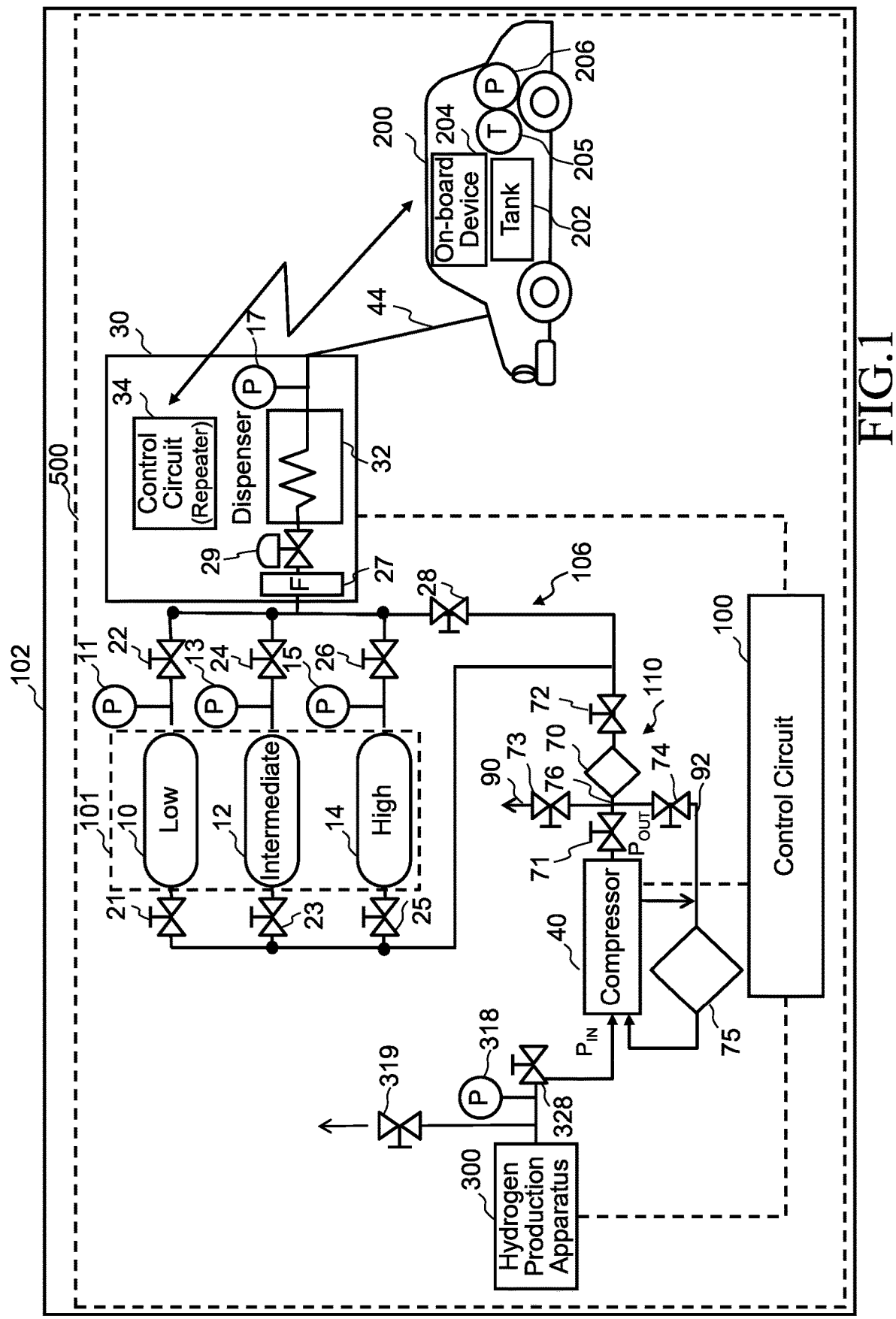
FIG. 1 is an example of a configuration diagram showing a configuration of a hydrogen gas supply system of a hydrogen station according to an embodiment 1.

FIG. 1 is an example of a configuration diagram showing a configuration of a hydrogen gas supply system of a hydrogen station according to an embodiment 1. In FIG. 1, a hydrogen gas supply system 500 is disposed in a hydrogen station 102. The hydrogen gas supply system 500 includes a hydrogen production apparatus 300, a multi-stage accumulator 101, a dispenser 30 (measuring device), a compressor 40, an adsorption column 70 (first adsorption column), an adsorption column control valve system 110, an adsorption column 75 (second adsorption column) and a control circuit 100. An example of the hydrogen gas supply apparatus which supplies hydrogen gas to the multi-stage accumulator 101 and/or the dispenser 30 is configured by the compressor 40, the adsorption column 70, the adsorption column control valve system 110, the adsorption column 75, pipes connecting those, etc. The example of FIG. 1 shows an example of the on-site ST, where the hydrogen production apparatus 300 is disposed in the hydrogen station 102. However, it is not limited thereto. A configuration (off-site ST) is also preferable where high purity hydrogen gas produced at another site is carried into the hydrogen station 102 by a hydrogen trailer, and temporarily accumulated in a curdle or intermediate accumulator (not shown).

The multi-stage accumulator 101 is composed of a plurality of pressure accumulators 10, 12, and 14. In the example of FIG. 1, the three accumulators 10, 12, and 14 configure the multi-stage accumulator 101. In the case of FIG. 1, for example, the pressure accumulator 10 functions as a 1st bank having a low use lower limit pressure. The pressure accumulator 12 functions as a 2nd bank having an intermediate use lower limit pressure, for example. The pressure accumulator 14 functions as a 3rd bank having a high use lower limit pressure, for example. However, it is not limited thereto. The pressure accumulators used as the 1st to 3rd banks are interchanged as needed.

Further, in FIG. 1, the suction side of the compressor 40 is connected by a pipe to the discharge side of the hydrogen production apparatus 300 via a valve 328.

The adsorption column 70 is disposed between the discharge port of the compressor 40 and the multi-stage accumulator 101. In the adsorption column 70, an adsorbent (first adsorbent) for adsorbing impurities in the hydrogen gas discharged from the compressor 40 is arranged. As the adsorbent for the adsorption column 70, it is preferable to use the one that has a high adsorption capacity for sulfur and halogen generated from component parts and the like of the compressor 40, and, for example, activated carbon is arranged. The adsorbent is not limited to the one formed from one layer, and may be from a plurality of layers of different kinds.

The adsorption column control valve system 110 is disposed at the gas inlet/outlet port side of the adsorption column 70, which is at the discharge side of the compressor 40. The adsorption column control valve system 110 is composed of a plurality of shutoff valves 71, 72, 73 and 74 (a plurality of valves) which can seal the adsorption column 70. The shutoff valve 71 (first valve) is disposed between the discharge port of the compressor 40 and the gas inlet port of the adsorption column 70. The shutoff valve 72 (second valve) is disposed between the gas outlet port of the adsorption column 70 and the multi-stage accumulator 101. In other words, the discharge side of the compressor 40 is connected by a pipe 76 to the gas inlet side of the adsorption column 70 via the shutoff valve 71 of the adsorption column control valve system 110. The gas outlet side (downstream side) of the adsorption column 70 is connected by a pipe to the multi-stage accumulator 101 side and/or the dispenser 30 side via the shutoff valve 72 of the adsorption column control valve system 110. Further, a return pipe 92, which is connected to the suction side of the compressor 40, branches between the shutoff valve 71 and the gas inlet port of the adsorption column 70.

In the middle of the return pipe 92, the adsorption column 75 is disposed. In the adsorption column 75, an adsorbent (second adsorbent) for adsorbing impurities in the hydrogen gas discharged from the compressor 40 is arranged. As the adsorbent for the adsorption column 75, it is preferable to use the one that has a high adsorption capacity for sulfur and halogen generated from component parts and the like of the compressor 40, and, for example, activated carbon is arranged. The adsorbent is not limited to the one formed from one layer, and may be from a plurality of layers of different kinds. Since the adsorption column 75 is used under a low pressure (e.g., 0.6 MPa), it is formed larger than the adsorption column 70. Since the capacity of the adsorption column 75 is larger than that of the adsorption column 70, the adsorbent amount on board of the adsorption column 75 can be large. Therefore, the impurities discharged from the adsorption column 70 at every regeneration time can be repeatedly removed by the adsorption column 75. The adsorbent of the adsorption column 70 may be exchanged, without being regenerated, when the adsorption performance is deteriorated. Since the adsorbent amount on board is large, the life can be extended. In the middle of the return pipe 92, the shutoff valve 74 (third valve) of the adsorption column control valve system 110 is disposed between the gas inlet of the adsorption column 70 and the gas inlet of the adsorption column 75.

A vent line 90 (vent pipe) branches from between the shutoff valve 71, which is disposed between the discharge port of the compressor 40 and the gas inlet port of the adsorption column 70, and the gas inlet port of the adsorption column 70. In the middle of the vent line 90, the shutoff valve 73 (fourth valve) of the adsorption column control valve system 110 is disposed.

The downstream side of the adsorption column 70 is connected by a pipe to the pressure accumulator 10 via the shutoff valve 72 and a valve 21. Similarly, the downstream side of the adsorption column 70 is connected by a pipe to the pressure accumulator 12 via the shutoff valve 72 and a valve 23. Similarly, the downstream side of the adsorption column 70 is connected by a pipe to the pressure accumulator 14 via the shutoff valve 72 and a valve 25. Similarly, the downstream side of the adsorption column 70 is connected by a pipe to the dispenser 30 via the shutoff valve 72 and a valve 28.

Further, the pressure accumulator 10 is connected by a pipe to the dispenser 30 via a valve 22. The pressure accumulator 12 is connected by a pipe to the dispenser 30 via a valve 24. The pressure accumulator 14 is connected by a pipe to the dispenser 30 via a valve 26.

Further, the discharge pressure of the hydrogen production apparatus 300 is measured by a manometer 318. The pressure in the pressure accumulator 10 is measured by a manometer 11. The pressure in the pressure accumulator 12 is measured by a manometer 13. The pressure in the pressure accumulator 14 is measured by a manometer 15.

In the dispenser 30, there are disposed a flow rate adjustment valve 29, a flowmeter 27, a cooler 32 (precooler), and a manometer 17. The flow rate of the hydrogen gas supplied from the multi-stage accumulator 101 or the compressor 40 is measured by the flowmeter 27, and adjusted by the flow rate adjustment valve 29. Then, the hydrogen gas is cooled to a predetermined temperature (e.g., −40° C.) by the cooler 32. Thus, the dispenser 30 fills a fuel tank 202 mounted on an FCV 200, which is a fuel cell vehicle powered by hydrogen gas, with the cooled hydrogen gas using, for example, a differential pressure. The outlet pressure (outlet pressure for filling fuel) at the outlet for filling hydrogen gas to be filled in the FCV 200 from the dispenser 30 is measured by the manometer 17. Further, a control circuit 34 is disposed inside or close to the dispenser 30, and configured to be communicable with an on-board device 204 in the FCV 200 (fuel cell vehicle powered by hydrogen gas) having arriving at the hydrogen station 102. For example, the control circuit 34 is configured to be radio communicable using infrared rays.

Hydrogen gas serving as a fuel supplied from the dispenser 30 is injected through the receiving port (receptacle) into the fuel tank 202 of the FCV 200 via a fuel passage. The pressure and temperature in the fuel tank 202 are measured by a manometer 206 and a thermometer 205 arranged inside the fuel tank 202 or at the fuel passage.

The hydrogen gas produced by the hydrogen production apparatus 300 is supplied in a low-pressure (e.g., 0.6 MPa) state to the suction side of the compressor 40. Therefore, the first side pressure $P_{IN}$ at the suction side of the compressor 40 is a low pressure at normal times. Under the control of the control circuit 100, the compressor 40 supplies the hydrogen gas supplied at a low pressure from the hydrogen production apparatus 300 to the pressure accumulators 10, 12, and 14 of the multi-stage accumulator 101 while compressing it. When the supply amount of hydrogen gas is insufficient in supplying it to the FCV 200 from the multi-stage accumulator 101, or when the multi-stage accumulator 101 is recovering pressure, the compressor 40, under the control of the control circuit 100, may directly supply the hydrogen gas, supplied at a low pressure from the hydrogen production apparatus 300, to the FCV 200 while compressing it via the dispenser 30.

The compressor 40 compresses hydrogen gas and supplies it to the pressure accumulator side which accumulates hydrogen gas. Specifically, the compressor 40 compresses hydrogen gas until the inside of each of the pressure accumulators 10, 12, and 14 of the multi-stage accumulator 101 becomes a predetermined high pressure (e.g., 82 MPa). In other words, the compressor 40 performs compression until a second side pressure $P_{OUT}$ at the discharge side becomes a predetermined high pressure (e.g., 82 MPa or more). Which of the pressure accumulators 10, 12, 14, and the dispenser 30 is to be a hydrogen gas supply party of the compressor 40 may be determined by controlling, by the control circuit 100, opening/closing of the corresponding valves 21, 23, 25, and 28 disposed in the respective pipes. Alternatively, it may be controlled to supply the hydrogen gas to two or more pressure accumulators at the same time.

The above-stated example describes the case where the pressure $P_{IN}$ for supplying hydrogen gas to the suction side of the compressor 40 is reduction-controlled to a predetermined low pressure (e.g., 0.6 MPa). However, it is not limited thereto. Hydrogen gas in a pressure state higher than the predetermined low pressure (e.g., 0.6 MPa) may be supplied to the suction side of the compressor 40 so as to be compressed. In that case, not a reciprocating compressor which uses the pressure $P_{IN}$ (first side pressure) at the suction side at a fixed pressure (e.g., 0.6 MPa), but a high pressure compressor which can variably change the pressure $P_{IN}$ (first side pressure) at the suction side is employed as the compressor 40. For example, it is preferable to use a multi-stage booster type compressor whose pressure $P_{IN}$ (first side pressure) at the suction side is, for example, 20 MPa or less.

The hydrogen gas accumulated in the multi-stage accumulator 101 is cooled by the cooler 32 in the dispenser 30, and supplied from the dispenser 30 to the FCV 200 arriving at the hydrogen station 102.

Figure 2:
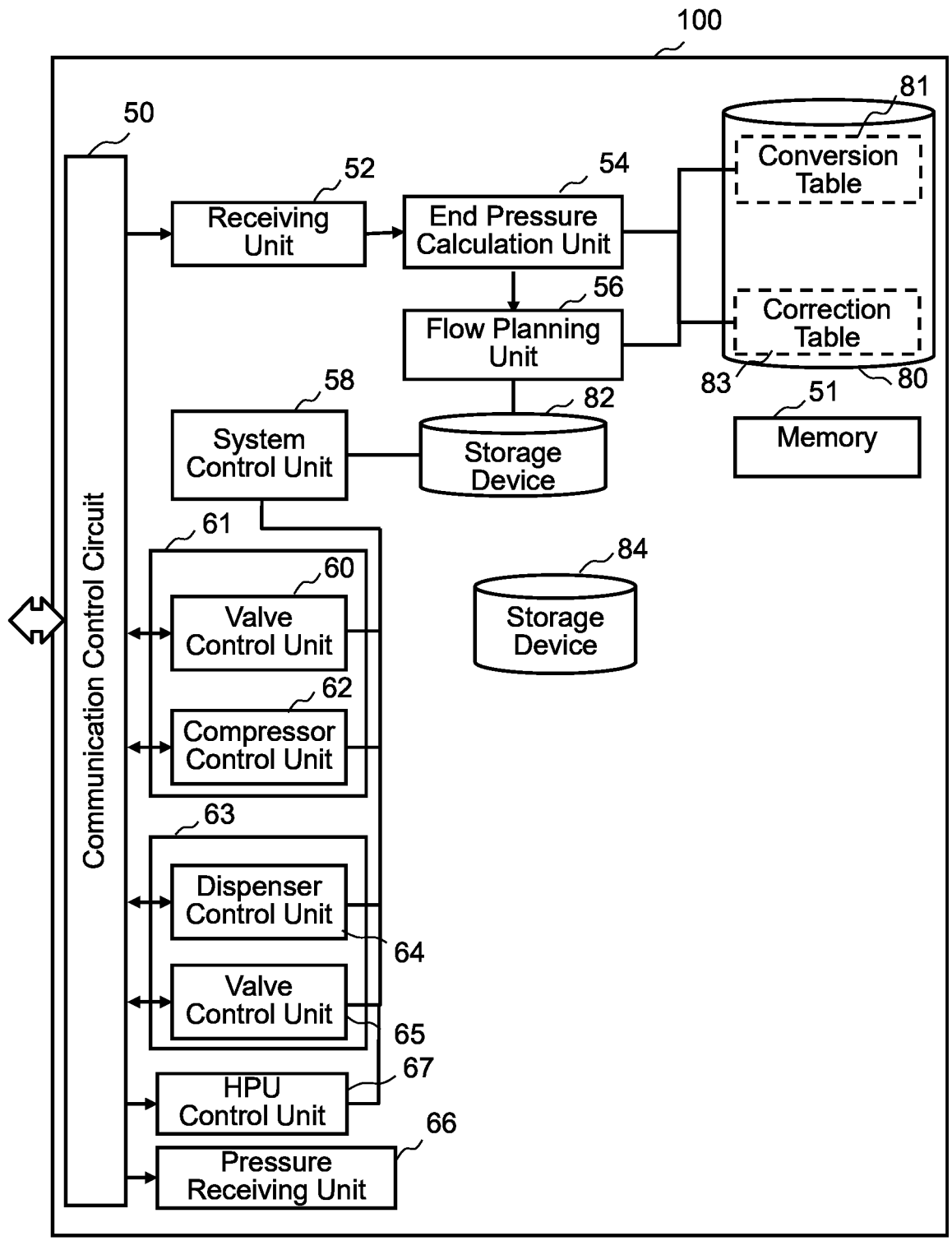
FIG. 2 is a configuration diagram showing an example of an internal structure of a control circuit according to the embodiment 1.

FIG. 2 is a configuration diagram showing an example of an internal structure of the control circuit 100 according to the embodiment 1. The control circuit 100 functions as a control apparatus. In FIG. 2, in the control circuit 100, there are disposed a communication control circuit 50, a memory 51, a receiving unit 52, an end pressure calculation unit 54, a flow planning unit 56, a system control unit 58, a pressure recovery control unit 61, a supply control unit 63, a pressure receiving unit 66, an HPU control unit 67, and storage devices 80, 82, and 84, such as magnetic disk drives. The pressure recovery control unit 61 includes a valve control unit 60 and a compressor control unit 62. The supply control unit 63 includes a dispenser control unit 64 and a valve control unit 65. Each of the "units" such as the receiving unit 52, the end pressure calculation unit 54, the flow planning unit 56, the system control unit 58, the pressure recovery control unit 61 (the valve control unit 60, the compressor control unit 62), the supply control unit 63 (the dispenser control unit 64, the valve control unit 65), the pressure receiving unit 66, and the HPU control unit 67 includes processing circuitry. The processing circuitry includes an electric circuit, a computer, a processor, a circuit board, a semiconductor device, or the like. As the processing circuitry, for example, a CPU (Central Processing Unit), an FPGA (Field-Programmable Gate Array), or an ASIC (Application Specific Integrated Circuit) may be used. Further, for each unit, common processing circuitry (same processing circuitry) may be used. Alternatively, different processing circuitry (separate processing circuitry) may be used. Input data required in the receiving unit 52, the end pressure calculation unit 54, the flow planning unit 56, the system control unit 58, the pressure recovery control unit 61 (the valve control unit 60, the compressor control unit 62), the supply control unit 63 (the dispenser control unit 64, the valve control unit 65), the pressure receiving unit 66, and the HPU control unit 67, or calculated results are stored in the memory 51 each time.

In the storage device 80, there is stored a conversion table 81 which shows correlation among FCV information, such as the pressure, temperature, and volume of the fuel tank 202 mounted on the FCV 200, a remaining hydrogen gas amount calculated based on the FCV information, and filling information, such as a final pressure and a final temperature to be filled in the fuel tank 202. Moreover, in the storage device 80, a correction table 83 for correcting results obtained from the conversion table 81 is stored.

In the hydrogen gas supply system 500, when the compressor 40 compresses the hydrogen gas having been refined to high purity by the hydrogen production apparatus 300, even if impurities such as sulfur and halogen generated from component parts and the like of the compressor 40 are mixed in the hydrogen gas, the impurities can be removed by the adsorption column 70 disposed at the downstream side of the compressor 40, and in addition to this, it is possible, using the adsorption column control valve system 110, the return pipe 92, and the adsorption column 75, to efficiently use the hydrogen gas remaining in the adsorption column 70 while inhibiting the impurities having been adsorbed by the adsorbent in the adsorption column 70 from desorbing and diffusing to the compressor 40 side (first side), (that is, inhibiting the quality of hydrogen gas to be supplied to the FCV, etc. from becoming out of specification (e.g., ISO standards). That is, the hydrogen gas supply system 500 can inhibit the quality of hydrogen gas to be supplied to the FCV, etc. from becoming out of specification (e.g., ISO standards) while avoiding wasting hydrogen gas.

Figure 3:
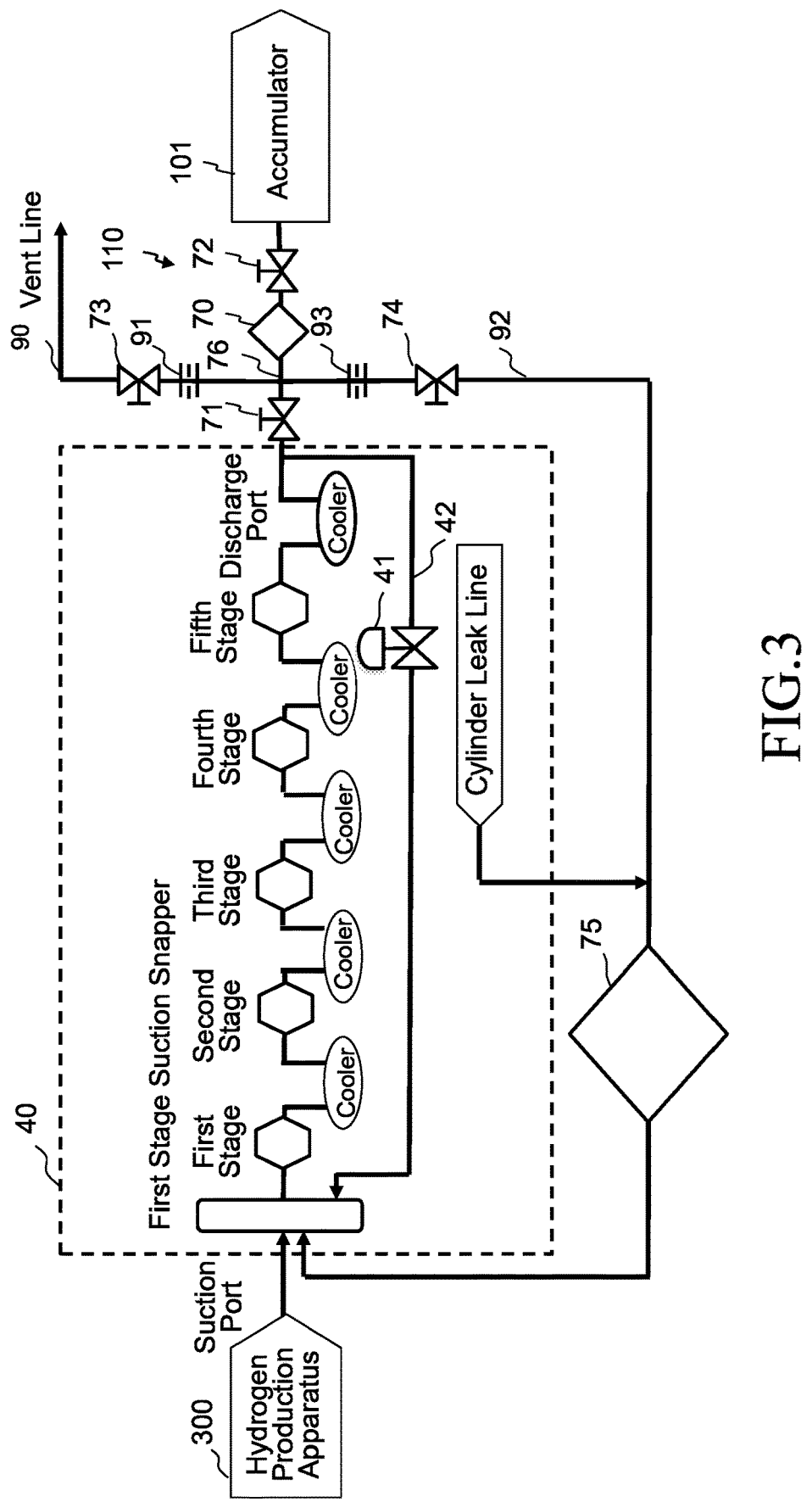
FIG. 3 is a configuration diagram showing an example of an internal structure of a compressor and an example of a structure of an adsorption column control valve system according to the embodiment 1.

FIG. 3 is a configuration diagram showing an example of an internal structure of a compressor and an example of a structure of an adsorption column control valve system according to the embodiment 1. In FIG. 3, descriptions of the structure from the hydrogen production apparatus 300 to the suction port of the compressor 40, and the structure from the shutoff valve 72 to the multi-stage accumulator 101 (and dispenser 30) are omitted. The example of FIG. 3 shows, as the compressor 40, a multi-stage compressor equipped with a five-stage compression mechanism. A cooler for cooling compressed hydrogen gas is individually disposed between each stage of the compression mechanism in the compressor 40. Moreover, a snapper is disposed at the suction side of the first stage of the compression mechanism. The snapper functions as an accumulation tank (buffer) for mitigating pulsation of the hydrogen gas supplied from the hydrogen production apparatus 300. Further, an orifice 91 (throttling mechanism) is disposed in the middle of the vent line 90 (vent pipe). A rapid pressure change due to opening of the vent line 90 can be reduced by the orifice 91. Further, the return pipe 92 is connected to, for example, a snapper as the suction side of the compressor 40. An orifice 93 (throttling mechanism) is arranged in the middle of the return pipe 92. A rapid pressure change in the case of flowing hydrogen gas to the return pipe 92 can be reduced by the orifice 93. Depending on the structure of the compressor 40, there may be a case where impurities, such as sulfur components, are generated in the cylinder in which a moving part, such as a piston, for driving each compression mechanism is arranged. Then, as shown in the example of FIG. 3, a cylinder leak line may be connected to the return pipe 92 between the gas inlet of the adsorption column 75, and the shutoff valve 74 in order to release the pressure in the cylinder and to adsorb/remove impurities, generated in the cylinder, by the adsorption column 75. Further, in the compressor 40, a decompression pipe 42, which connects the discharge side of the last stage compression mechanism and the snapper at the suction side of the first stage compression mechanism of the compressor 40, is connected via a flow rate adjustment valve 41.

Figure 4:
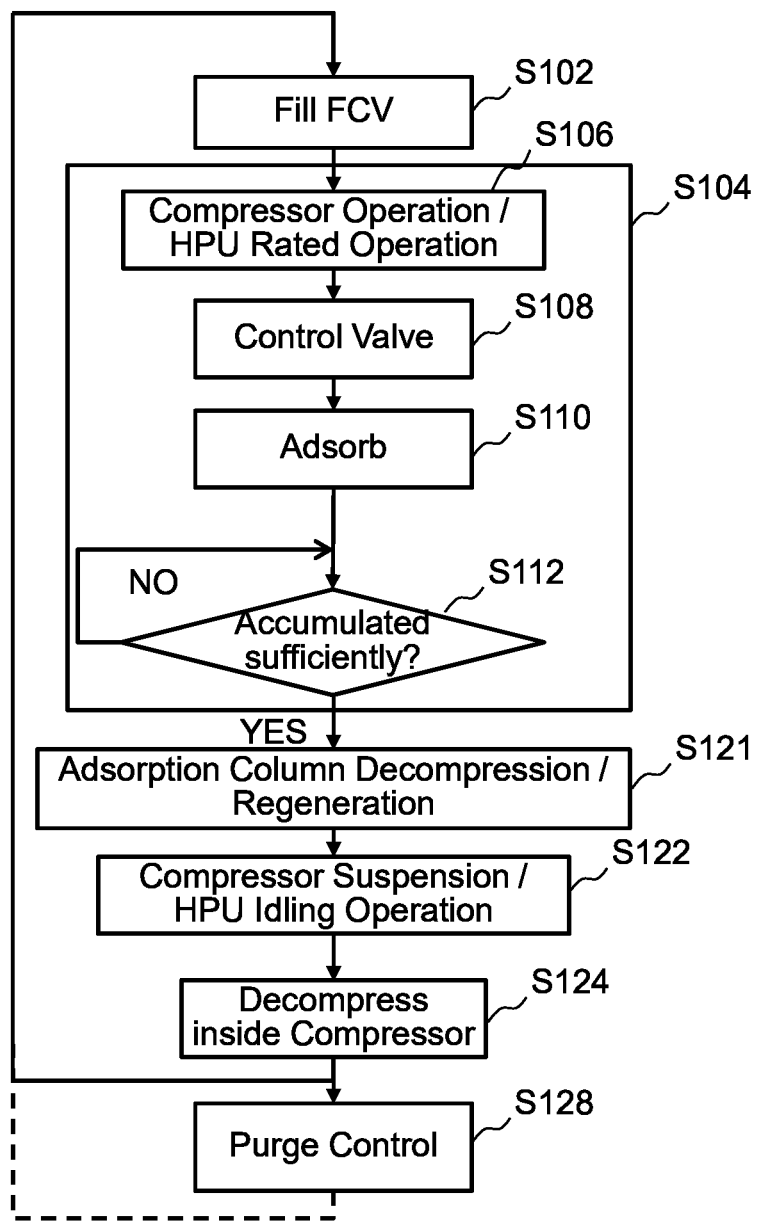
FIG. 4 is a flowchart showing main steps of an example of a hydrogen gas supply method according to the embodiment 1.

FIG. 4 is a flowchart showing main steps of an example of a hydrogen gas supply method according to the embodiment 1. In FIG. 4, the hydrogen gas supply method of the embodiment 1 executes a series of steps: an FCV filling step 102, a pressure accumulation step (S104), an adsorption column decompression/regeneration step (S121), a compressor suspension and HPU idling operation step (S122), an in-compressor decompression step (S124), and a purge control step (S128). The pressure accumulation step (S104) executes a series of steps as internal steps: a compressor operation and HPU rated operation step (S106), a valve control step (S108), an adsorption step (S110), and a determination step (S112). The hydrogen purge control step (S128) does not need to be executed each time. For example, with respect to the cycle of the respective steps in FIG. 4, the hydrogen purge step (S128) may be executed once for several cycles. Needless to say, it may be carried out each time.

In the FCV filling step 102, hydrogen gas is supplied to the FCV 200, and the fuel tank 202 in the FCV 200 is filled with the hydrogen gas. Specifically, as an example, it operates as follows: Here, description is started from a state where hydrogen gas of a specified pressure (e.g., 82 MPa) is accumulated in the multi-stage compressor 101.

When the FCV 200 arrives at the hydrogen station 102, a worker of the hydrogen station 102 or a user of the FCV 200 connects (fits) a nozzle 44 of the dispenser 30 to the receiving port (receptacle) of the fuel tank 202 of the FCV 200, and fixes the nozzle 44. When the FCV 200 arrives at the hydrogen station 102, and the user or a worker of the hydrogen station 102 connects and fixes the nozzle 44 of the dispenser 30 to the receiving port (receptacle) of the fuel tank 202 of the FCV 200, a communication between the on-board device 204 and the control circuit 34 (repeater) is established.

Next, when the communication between the on-board device 204 and the control circuit 34 is established, FCV information such as the present pressure and temperature of the fuel tank 202, and the volume of the fuel tank 202 is output (transmitted) in real time from the on-board device 204. The FCV information is relayed by the control circuit 34 and transmitted to the control circuit 100. In the control circuit 100, the receiving unit 52 receives the FCV information via the communication control circuit 50. While the communication between the on-board device 204 and the control circuit 34 is established, the FCV information is monitored at all times or at predetermined sampling intervals (e.g., 10 msec to several seconds). The received FCV information is stored in the storage device 80 together with receiving time information.

The end pressure calculation unit 54 reads the conversion table 81 from the storage device 80, and calculates and estimates a final pressure PF corresponding to a received pressure Pa and temperature Ti of the fuel tank 202 at the initial reception time, a volume V of the fuel tank 202, and an outside air temperature T'. Moreover, the end pressure calculation unit 54 reads the correction table 83 from the storage device 80, and corrects a numerical value obtained from the conversion table 81 as necessary. If there is a large error in an obtained result based on only data of the conversion table 81, the correction table 83 may be provided on the basis of a result obtained by an experiment, a simulation or the like. The calculated final pressure PF is output to the system control unit 58.

Next, the flow planning unit 56 creates, using the multi-stage accumulator 101, a filling control flow plan for performing differential pressure supplying (filling) of hydrogen gas to the fuel tank 202 of the FCV 200. The flow planning unit 56 creates a plan of a filling control flow which includes a selection of the accumulator (selecting from the pressure accumulators 10, 12, and 14) and a switching timing of the multi-stage accumulator 101 in order to make the pressure in the fuel tank 202 be the final pressure PF. Control data of the created filling control flow plan is temporarily stored in the storage device 82. When planning the filling control flow, the flow planning unit 56 sets a pressure increase rate depending on the outside temperature, and calculates a filling speed corresponding to the pressure increase rate. Further, after in the middle of filling, in order to inhibit a rapid temperature increase, the flow planning unit 56 calculates a filling speed corresponding to the pressure increase rate depending on an outside temperature. The pressure increase rate determined depending on an outside temperature is beforehand included in the data of the conversion table 81. The filling control flow is planned on these conditions, and a time t (end time 1) (reaching time) from starting filling to reaching the final pressure PF is obtained.

Figure 5:
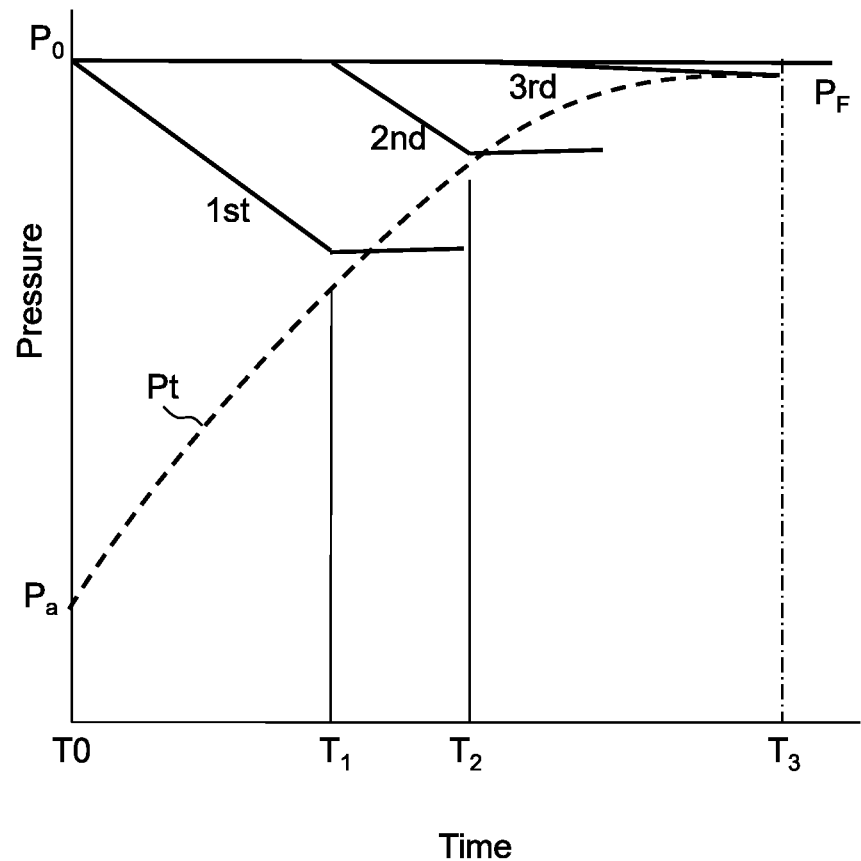
FIG. 5 is a diagram illustrating a filling method in a case of performing differential pressure filling of hydrogen fuel by using a multi-stage accumulator according to the embodiment 1.

Along with the created filling control flow, the fuel tank 202 mounted on the FCV 200 powered by hydrogen gas is filled with hydrogen gas from the dispenser 30 (measuring device). Specifically, it operates as follows:

FIG. 5 is a diagram illustrating a filling method in a case of performing differential pressure filling of hydrogen fuel by using a multi-stage accumulator according to the embodiment 1. In FIG. 5, the ordinate axis indicates a pressure and the abscissa axis indicates a time. When performing differential pressure filling of hydrogen fuel to the FCV 200, the pressures in the accumulators 10, 12, and 14 of the multi-stage accumulator 101 are generally accumulated in advance at the same pressure P0 (e.g., 82 MPa). On the other hand, the fuel tank 202 of the FCV 200 arriving at the hydrogen station 102 has a pressure Pa. It will be described where filling the fuel tank 202 of the FCV 200 starts from the state described above.

First, filling the fuel tank 202 starts from the 1st bank, for example, the pressure accumulator 10. Specifically, it operates as follows: Under the control of the system control unit 58, the supply control unit 63 controls the supply unit 106 to supply the hydrogen fuel from the pressure accumulator 10 into the fuel tank 202 of the FCV 200. Specifically, the system control unit 58 controls the dispenser control unit 64 and the valve control unit 65. The dispenser control unit 64 communicates with the control circuit 34 of the dispenser 30 via the communication control circuit 50, and controls the operation of the dispenser 30. Specifically, first, the control circuit 43 adjusts the opening degree of the flow rate adjustment valve 29 in the dispenser 30 so that the filling speed may be a calculated filling speed M. Then, the valve control unit 65 outputs control signals to the valves 22, 24, and 26 via the communication control circuit 50, and controls opening/closing of each valve. Specifically, the valve 22 is opened, and the valves 24 and 26 are kept in a state of closed. Thereby, the hydrogen fuel is supplied from the pressure accumulator 10 to the fuel tank 202. By the differential pressure between the pressure accumulator 10 and the fuel tank 202, the hydrogen fuel accumulated in the pressure accumulator 10 moves toward the fuel tank 202 side at an adjusted filling speed, and the pressure in the fuel tank 202 gradually increases as shown by a dotted line Pt. Along with this, the pressure (the graph indicated by "1st") of the pressure accumulator 10 gradually decreases. Then, at the time of reaching the use lower limit pressure of the 1st bank, which indicates that a time T1 has elapsed since starting of filling, the accumulator to be used is switched from the pressure accumulator 10 to the 2nd bank, for example, the pressure accumulator 12. Specifically, the valve control unit 65 outputs a control signal to the valves 22, 24, and 26 via the communication control circuit 50, and controls opening/closing of each valve. Specifically, the valve 22 is closed, the valve 24 is opened, and the valve 26 is kept in a state of closed. Thereby, since the differential pressure between the pressure accumulator 12 and the fuel tank 202 is large, the state in which the filling speed is high can be maintained.

Then, by the differential pressure between the 2nd bank, for example, the pressure accumulator 12 and the fuel tank 202, the hydrogen fuel accumulated in the pressure accumulator 12 moves toward the fuel tank 202 side at a filling speed similarly adjusted, and the pressure in the fuel tank 202 gradually increases as indicated by the dotted line Pt. Along with this, the pressure (the graph indicated by "2nd") of the pressure accumulator 12 gradually decreases. Then, at the time of reaching the use lower limit pressure of the 2nd bank, which indicates that a time T2 has elapsed since starting of filling, the accumulator to be used is switched from the pressure accumulator 12 to the 3rd bank, for example, the pressure accumulator 14. Specifically, the valve control unit 65 outputs control signals to the valves 22, 24, and 26 via the communication control circuit 50, and controls opening/closing of each valve. Specifically, the valve 24 is closed, the valve 26 is opened, and the valve 22 is kept in a state of closed. Thereby, since the differential pressure between the pressure accumulator 14 and the fuel tank 202 is large, the state in which the filling speed is high can be maintained.

Then, by the differential pressure between the 3rd bank, for example, the pressure accumulator 14 and the fuel tank 202, the hydrogen fuel accumulated in the pressure accumulator 14 moves toward the fuel tank 202 side at an adjusted filling speed, and the pressure in the fuel tank 202 gradually increases as shown by the dotted line Pt.

Along with this, the pressure (the graph indicated by "3rd") in the pressure accumulator 14 gradually decreases. Then, by the accumulator 14 serving as the 3rd bank, the filling is performed until the pressure in the fuel tank 202 reaches a calculated final pressure PF (e.g., 65 to 81 MPa).

As described above, filling the fuel tank 202 with the hydrogen gas is performed in order from the 1st bank. The above example describes the case where the pressure P1 of the fuel tank 202 of the FCV 200 arriving at the hydrogen station 102 is sufficiently lower than the level of the use lower limit pressure of the pressure accumulator 10 serving as a preset low pressure bank. As an example, the case is described where it is sufficiently low such as ½ or less of the one at the full filling (filling up) time. In such a case, in order to rapidly charge the pressure to the fuel tank 202 of the FCV 200 to be the final pressure PF, the three accumulators 10, 12, and 14, for example, are required. However, the pressure in the fuel tank 202 of the FCV 200 arriving at the hydrogen station 102 is not limited to being sufficiently low. When the pressure in the fuel tank 202 is higher than, for example, ½ of the one at the full filling (filling up) time, two accumulators 10 and 12, for example, may be sufficient. Further, when the pressure in the fuel tank 202 is high, one accumulator 10, for example, may be sufficient. In any case, the accumulator to be used is switched between the pressure accumulators 10, 12, and 14.

When filling (supplying) of the hydrogen gas into the fuel tank 202 of the FCV 200 is completed, the nozzle 44 of the dispenser 30 is removed from the receiving port (receptacle) of the fuel tank 202 of the FCV 200, and after paying a fee corresponding to the filling amount, for example, the user leaves the hydrogen station 102.

In the pressure accumulation step (S104), the compressor 40 compresses hydrogen gas and supplies it to the pressure accumulator side which accumulates the hydrogen gas. Specifically, it operates as follows:

In the compressor operation and HPU rated operation step (S106), the multi-stage accumulator 101 starts filling hydrogen to the FCV 200. When the pressure in any of the accumulators in the multi-stage accumulators 101 decreases, and/or when the filling amount of the hydrogen supply from the multi-stage accumulator 101 to the FCV 200 is insufficient, the hydrogen production apparatus 300 shifts from an idling operation to a rated operation (e.g., 100% load operation) under the control of the HPU control unit 67, and increases the amount of hydrogen gas produced. In that case, the valve control circuit 60 makes an open valve 319 close, and the valve 328 open. Then, under the control of the compressor control unit 62, the compressor 40 starts the operation, and compresses and discharges the low-pressure hydrogen gas supplied from the hydrogen production apparatus 300.

In the valve control step (S108), the valve control circuit 60 controls the adsorption column control valve system 110 so that compressed hydrogen gas may be supplied to the pressure accumulator side.

Figure 6:
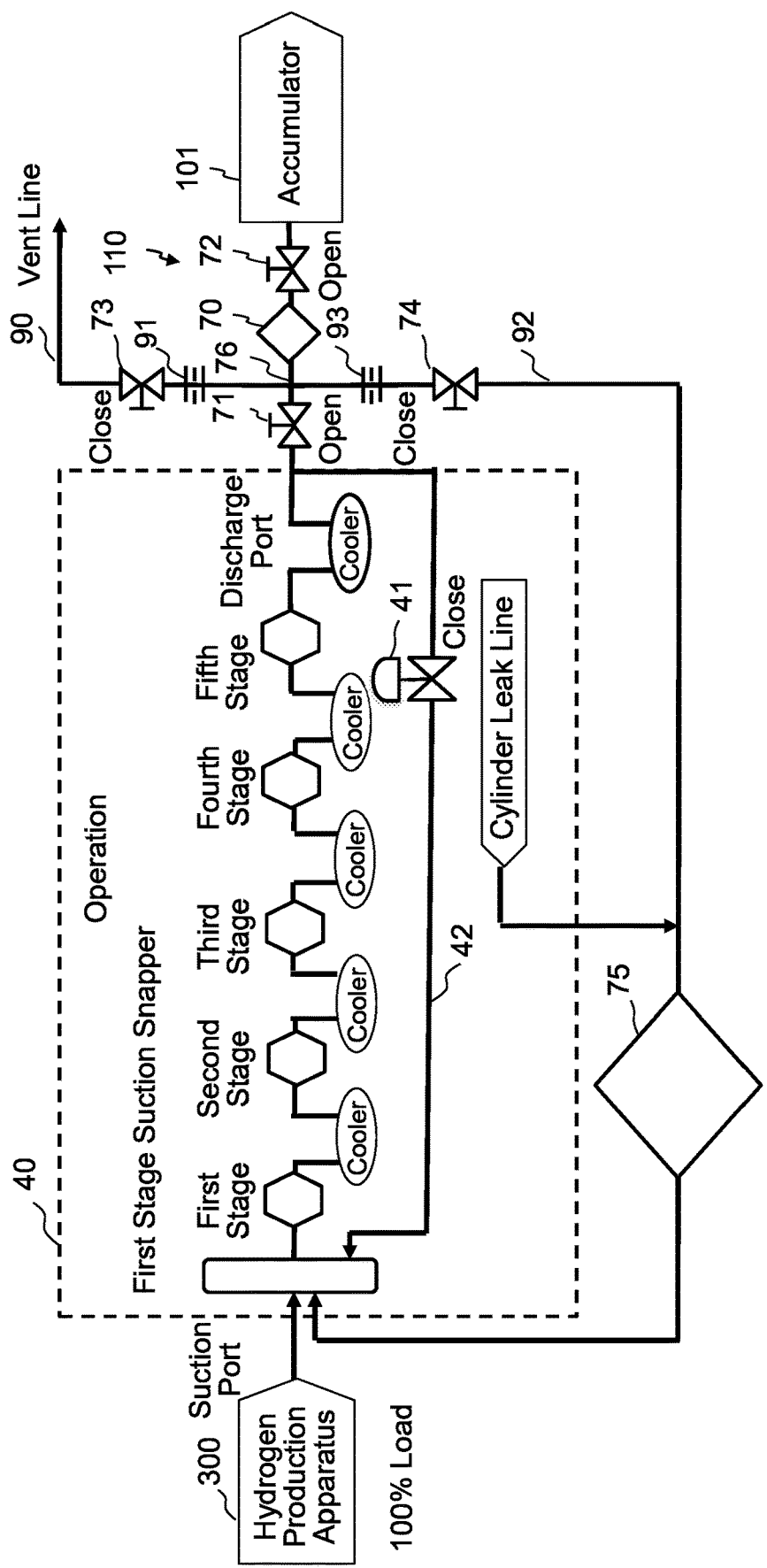
FIG. 6 is a diagram illustrating operations of an adsorption column control valve system at the time of a pressure accumulation step according to the embodiment 1.

FIG. 6 is a diagram illustrating operations of the adsorption column control valve system at the time of the pressure accumulation step according to the embodiment 1. In FIG. 6, the valve control circuit 60 controls the shutoff valves 73 and 74 to be closed, and the shutoff valves 71 and 72 to be opened from closed.

In the adsorption step (S110), using the adsorption column 70 with an adsorbent arranged, impurities in the hydrogen gas discharged from the compressor 40 are adsorbed onto the adsorbent in the adsorption column 70. Then, the hydrogen gas of high purity because of the impurities having been adsorbed is supplied to the multi-stage accumulator 101 side from the gas outlet of the adsorption column 70.

Further, the valve control unit 60 opens, for example, the valve 25 from the state where the valves 21, 22, 23, 24, 25, 26, and 28 are closed.

Then, hydrogen gas, which has been compressed from a low pressure (e.g., 0.6 MPa) by the operation of the compressor 40 and whose impurities have been adsorbed by the adsorbent in the adsorption column 70, is charged into the accumulator 14 until the pressure in the accumulator 14 reaches a predetermined pressure P0 (e.g., 82 MPa). By this, the pressure in the accumulator 14 is accumulated (recovered).

Next, the valve control unit 60 closes the valve 25, and instead opens the valve 23.

Then, similarly, hydrogen gas is charged into the accumulator 12 until the pressure in the accumulator 12 reaches a predetermined pressure P0 (e.g., 82 MPa), thereby accumulating (recovering) the pressure in the accumulator 12.

Next, the valve control unit 60 closes the valve 23, and instead opens the valve 21.

Then, similarly, hydrogen gas is charged into the accumulator 10 until the pressure in the accumulator 10 reaches a predetermined pressure P0 (e.g., 82 MPa), thereby accumulating (recovering) the pressure in the accumulator 10.

In the determination step (S112), the system control unit 58 determines whether the pressures of all the accumulators 10, 12, and 14 of the multi-stage accumulator 101 have been accumulated to a predetermined pressure P0 (e.g., 82 MPa). If not having been accumulated up to the predetermined pressure P0 (e.g., 82 MPa) yet, the pressure accumulation is continued. When having been accumulated up to the predetermined pressure P0 (e.g., 82 MPa), it proceeds to the next step. Although the case where pressure accumulation is continued until the pressures of all the accumulators 10, 12, and 14 of the multi-stage accumulator 101 have been sufficiently accumulated is described here as an example, it is not limited thereto. The pressure accumulation step (S104) may be ended at the stage where pressure accumulation of any one of the accumulators 10, 12, and 14 has been sufficiently performed.

By the process described above, the pressures of the accumulators 10, 12, and 14 can be accumulated up to the predetermined pressure P0 (e.g., 82 MPa). Thereby, preparation for differential pressure filling to the FCV 200 by the multi-stage accumulator 101 is performed.

In the adsorption column decompression/regeneration step (S121), in the state where the adsorption column 70 is blocked from the compressor 40 by the shutoff valve 71, the inside of the adsorption column 70 is depressurized from a high pressure to a low pressure by flowing the compressed hydrogen gas in the adsorption column 70 into the return pipe 92 by opening the shutoff valve 74. Further, impurities desorbed from the adsorbent in the adsorption column 70 are adsorbed by the adsorbent in the adsorption column 75 by flowing the compressed hydrogen gas in the adsorption column 70 into the return pipe 92 by opening the shutoff valve 74.

Figure 7:
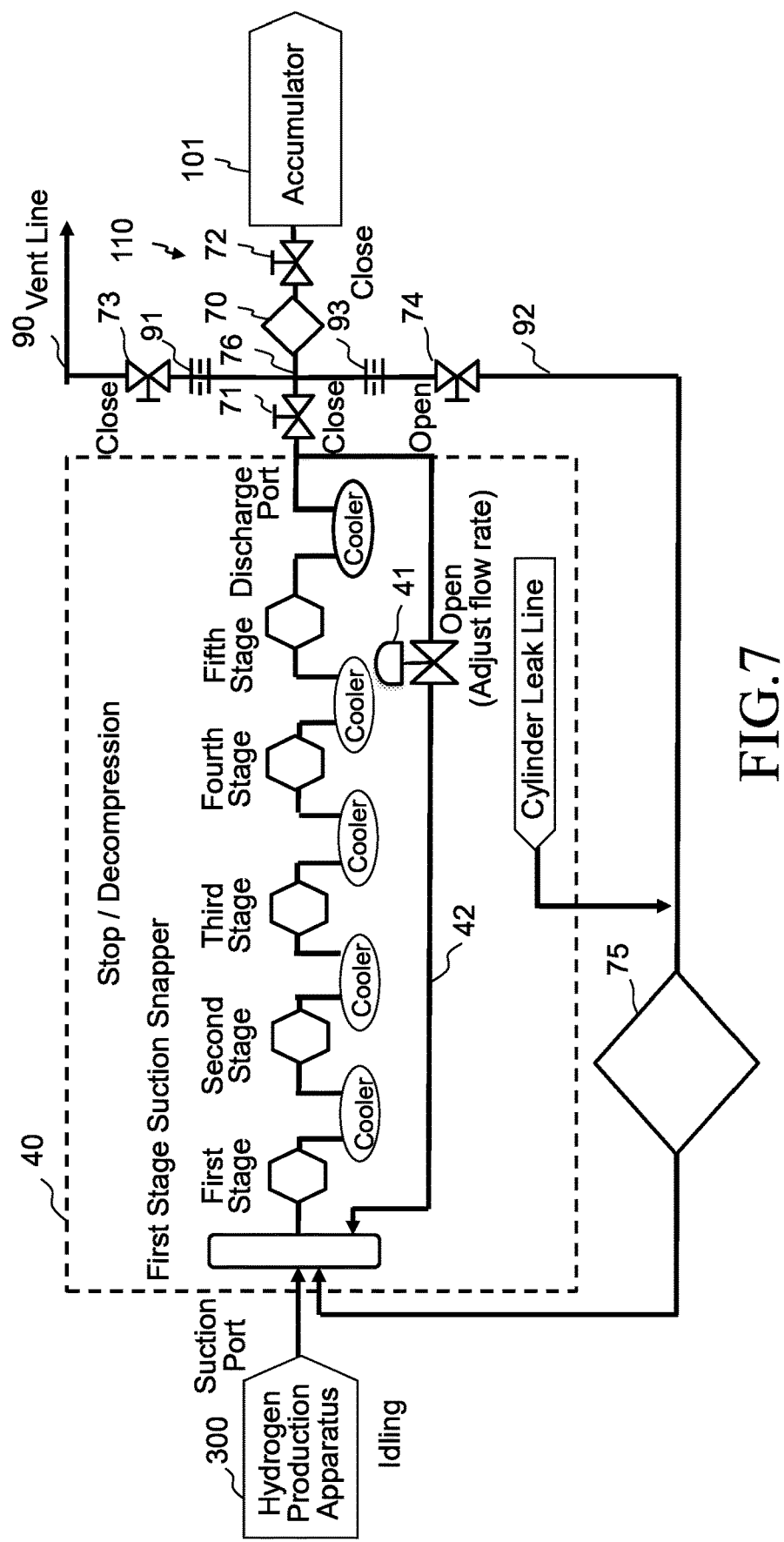
FIG. 7 is a diagram illustrating an example of operations of an adsorption column control valve system at the time of an adsorption column decompression/regeneration step according to the embodiment 1.

FIG. 7 is a diagram illustrating an example of operations of an adsorption column control valve system at the time of the adsorption column decompression/regeneration step according to the embodiment 1. In FIG. 7, the valve control unit 60 closes the shutoff valves 71 and 72, and opens the shutoff valve 74 from the state where the shutoff valves 71 and 72 are open and the shutoff valves 73 and 74 are closed. Thereby, the compressor 40 and the adsorption column 70 are shut off by the shutoff valve 71. Then, the high-pressure hydrogen gas remaining in the adsorption column 70 is returned to the suction side of the compressor 40 through the return pipe 92. At this time, since the orifice 93 is disposed in the return pipe 92, a rapid pressure change can be inhibited, thereby inhibiting damage to component parts of the adsorption column 70, etc., or breakage, etc. of the adsorbent such as activated carbon. Further, pressure increase at the gas inlet side of the adsorption column 75 can be inhibited, and the adsorption column 75 can be used at a greatly lower pressure than the working pressure of the adsorption column 70. Because the pressure inside the adsorption column 70 is depressurized, adsorbed impurities desorb from the adsorbent. Then, the impurities diffuse to the return pipe 92 along the flow of the internal hydrogen gas. If this goes on, it ends in that the impurities removed purposely will be returned to the suction side of the compressor 40. Therefore, according to the embodiment 1, the impurities desorbed from the adsorbent in the adsorption column 70 are adsorbed by the adsorbent in the adsorption column 75. Thereby, the adsorbent of the adsorption column 70 can be regenerated (refreshed). Accordingly, even when the adsorption column 70 is miniaturized and the on-board amount of the adsorbent is small, the adsorption performance of the adsorbent can be extended. Simultaneously, the impurities in the hydrogen gas in the adsorption column 70 are adsorbed by the adsorbent in the adsorption column 75, and therefore, the hydrogen gas becoming of high purity is returned to the suction side of the compressor 40 so as to be reused.

Figure 8:
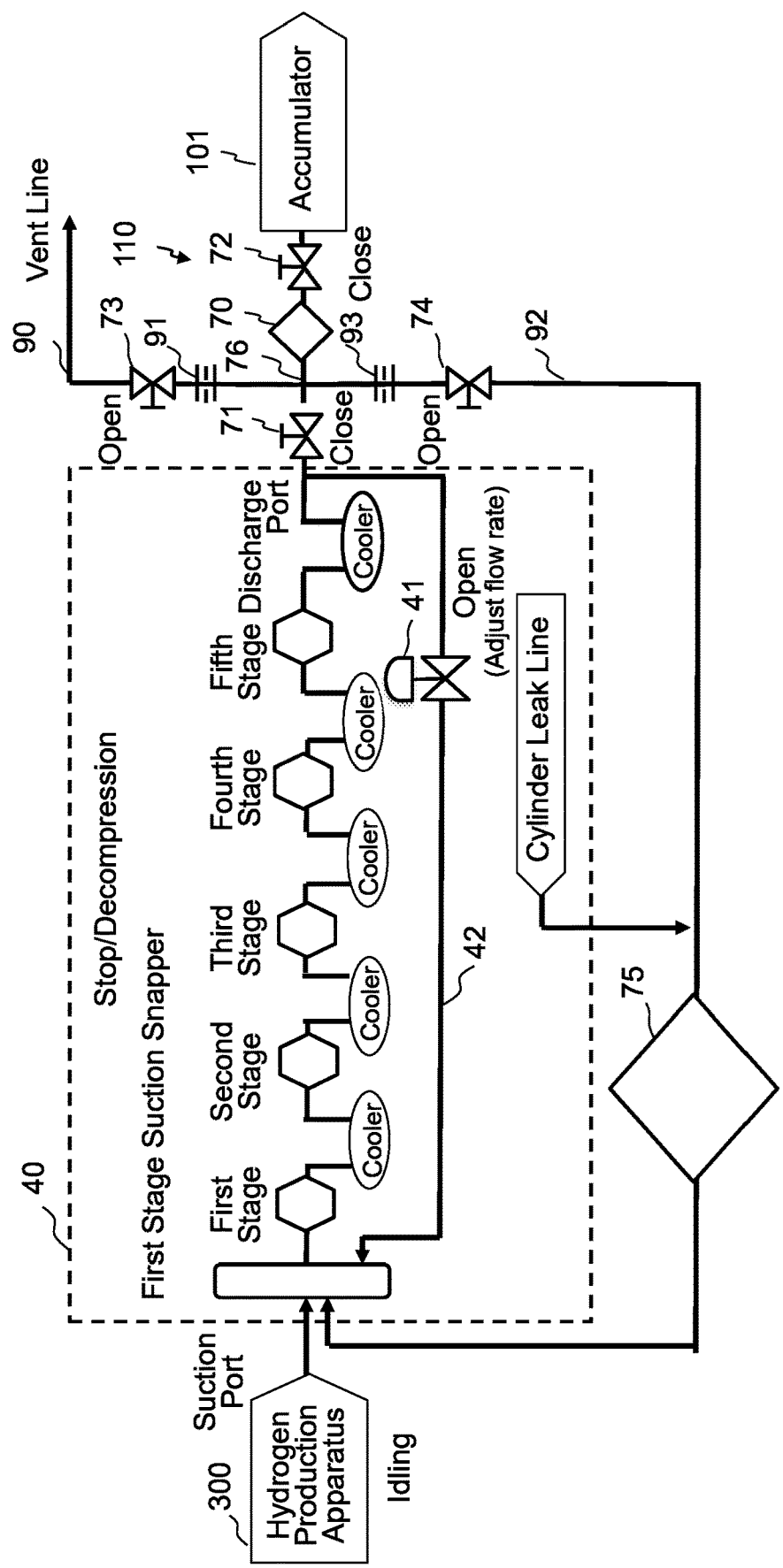
FIG. 8 is a diagram illustrating another example of operations of an adsorption column control valve system at the time of an adsorption column decompression/regeneration step according to the embodiment 1.

FIG. 8 is a diagram illustrating another example of operations of an adsorption column control valve system at the time of an adsorption column decompression/regeneration step according to the embodiment 1. In FIG. 8, the valve control unit 60 may close the shutoff valves 71 and 72 and open the shutoff valves 73 and 74 from the state where the shutoff valves 71 and 72 are open and the shutoff valves 73 and 74 are closed. Thereby, the hydrogen gas in the adsorption column 70 is discharged further to the vent line 90 in addition to being discharged to the return pipe 92. Therefore, the inside of the adsorption column 70 is depressurized from a high pressure to a low pressure, and the impurities desorbed from the adsorbent in the adsorption column 70 are discharged to the vent line 90. It may be appropriately set whether or not to use the vent line 90 in addition to the return pipe 92. Although the amount of hydrogen gas to be reused decreases by using the vent line 90, the time needed to depressurize the inside of the adsorption column 70 can be reduced.

Alternatively, as it is not limited to the case where the shutoff valves 73 and 74 are opened simultaneously, a time difference may be set between operations of opening the shutoff valves 73 and 74. It is no problem whichever of them is opened first.

In the compressor suspension and HPU idling operation step (S122), the hydrogen production apparatus 300 shifts from a rated operation (e.g., 100% load operation) to an idling operation (e.g., 30% load operation) under the control of the HPU control unit 67, thereby reducing the amount of hydrogen gas produced. The valve control circuit 60 controls the open valve 319 to be open from closed, and the valve 328 to be closed from open, thereby stopping supplying hydrogen gas to the compressor 40. A small amount of hydrogen gas produced by the idling operation is discharged to the air because the open valve 319 has become open. Then, under the control of the compressor control unit 62, the operation of the compressor 40 is suspended (stopped). Therefore, while the operation of the compressor 40 is completely stopped, the shutoff valves 71 and 72 are controlled to be closed.

In the in-compressor decompression step (S124), under the control of the compressor control unit 62, while the flow rate adjustment valve 41 adjusts the flow rate at a predetermined opening degree, the pressure inside the compressor 40 is depressurized down to the pressure at the suction side of the compressor 40 via the decompression pipe 42.

Here, even when the discharge side of the compressor 40 is depressurized, since the discharge port of the compressor 40 and the gas inlet port of the adsorption column 70 are shut off by the shutoff valve 71, it is possible to prevent or inhibit impurities desorbed from the adsorbent in the adsorption column 70 from diffusing toward the compressor 40 side (first side).

In the purge control step (S128), after a predetermined time has elapsed since the shutoff valve 73 was opened, the control apparatus 100 controls to close the shutoff valve 74, open the shutoff valve 71, and supply the hydrogen gas supplied from the hydrogen production apparatus 300 through the compressor 40 being stopped to the adsorption column 70. Specifically, in the state where the compressor 40 is stopped (suspended) and the inside of the adsorption column 70 has been depressurized to a low pressure, the hydrogen gas supplied from the hydrogen production apparatus 300 through the compressor 40 being stopped is introduced as a purge gas to the adsorption column 70. The "predetermined time" here is equivalent to a time assumed to be a period in which, for example, the pressure of a sealed space (space closed by the shutoff valves 71, 72, 73, and 74) becomes equal to or less than the supply pressure from the hydrogen producing device 300. The gas volume for a sealed space and the time for discharging the gas volume can be calculated based on the pipe diameter, the pipe length, the volume of the adsorption column 70, the pressure at the time of sealing, etc.

Figure 9:
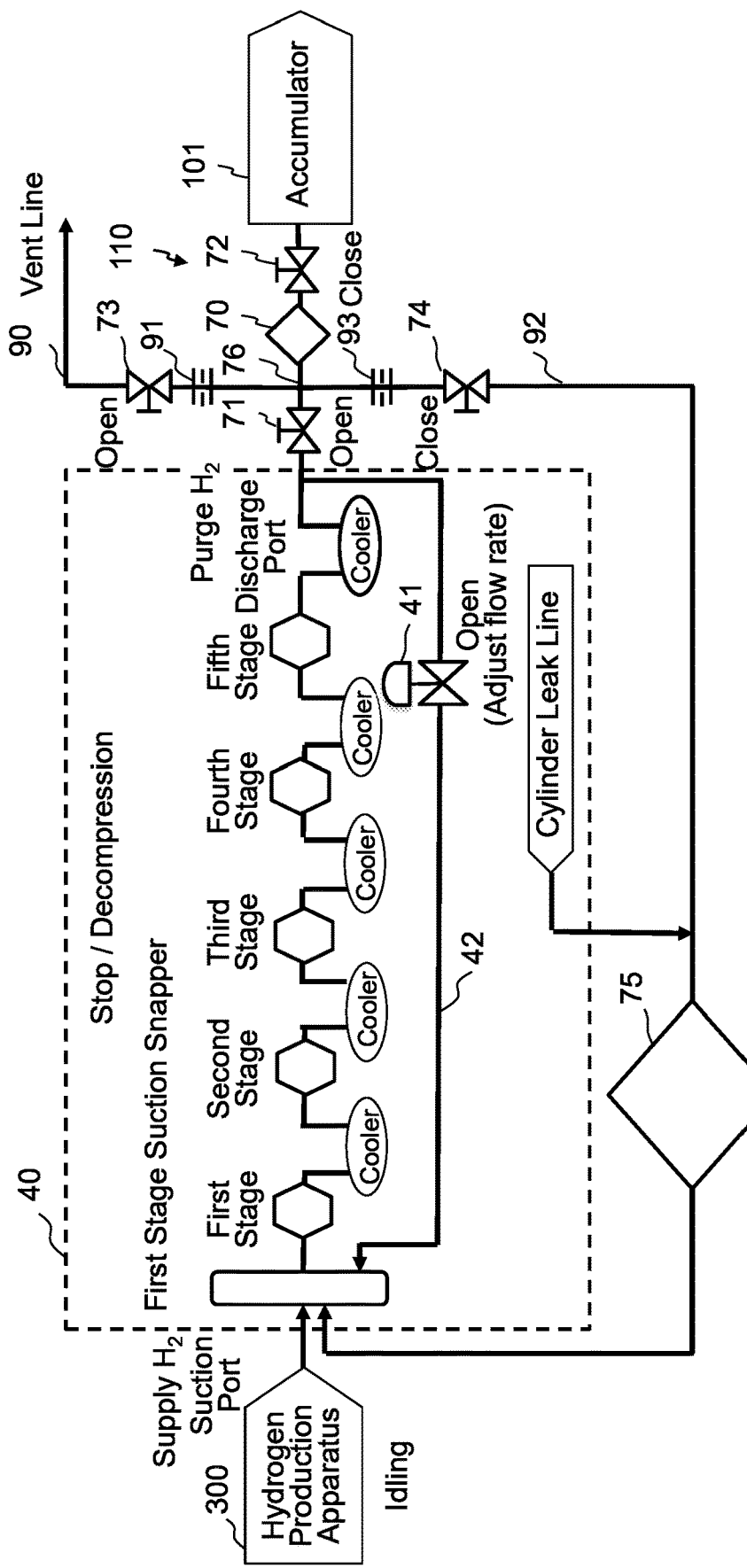
FIG. 9 is a diagram illustrating operations of an adsorption column control valve system at the time of a purge control step according to the embodiment 1.

FIG. 9 is a diagram illustrating operations of an adsorption column control valve system at the time of the hydrogen purge control step according to the embodiment 1. In the hydrogen production apparatus 300 under an idling operation, high-purity hydrogen gas is continued to be produced although the production amount is small. Conventionally, the hydrogen gas produced by the hydrogen production apparatus 300 under an idling operation is not supplied to the compressor 40, but is discharged from the vent line via the open valve 319. Then, in the example of FIG. 9, the valve control unit 60 controls to open the shutoff valves 71 and 73, close the shutoff valves 72 and 74, close the open valve 319, and open the valve 328. By this, the hydrogen gas produced by the hydrogen production apparatus 300 under an idling operation is supplied into the adsorption column 70 through the compressor 40 being stopped, and is discharged from the vent line 90. By using this hydrogen gas as a purge gas to be introduced into the adsorption column 70, regeneration of the adsorbent can be accelerated. It is assumed that impurities such as sulfur and halogen are generated due to sliding of the piston ring and the like which is generated by driving a piston during the operation of the compressor 40, for example. Accordingly, it is assumed that impurities such as sulfur and halogen are not generated while the compressor 40 is suspended (stopped), and therefore, hydrogen gas maintaining high purity can be used as a purge gas. Further, by using the hydrogen gas produced by the hydrogen production apparatus 300 under the idling operation as a purge gas, hydrogen gas conventionally discarded can be utilized.

When the next FCV 200 arrives at the hydrogen station 102, it returns to the FCV filling step (102), and each step from the FCV filling step (102) to the in-compressor decompression step (S124) (or the purge control step (S128)) is repeated.

As described above, according to the embodiment 1, it is possible to efficiently use hydrogen gas remaining in the adsorption column 70 while inhibiting impurities of the hydrogen gas, adsorbed by an adsorbent disposed at the downstream side of the compressor 40, from diffusing to the compressor 40 side. Further, the adsorbent in the adsorption column 70 can be regenerated, and the adsorption performance of the adsorbent in the adsorption column 70 can be extended. Therefore, it is also possible to further miniaturize the adsorption column 70.

Embodiments have been explained referring to specific examples described above. However, the present invention is not limited to these specific examples. For example, the present invention can also be applied to a hydrogen production apparatus by electrolysis.

Further, while the apparatus configuration, control method, and the like not directly necessary for explaining the present invention are not described, necessary apparatus configuration and control method can be appropriately selected and used.

In addition, all operation methods and control devices of a hydrogen production apparatus that include elements of the present invention and that can be appropriately modified by those skilled in the art are included within the scope of the present invention.

INDUSTRIAL APPLICABILITY

The present invention relates to a hydrogen gas supply apparatus and a hydrogen gas supply method, and can be applied to, for example, a hydrogen gas supply apparatus and hydrogen gas supply method arranged at a hydrogen station.

REFERENCE SIGNS LIST 10, 12, 14 Accumulator,
11, 13, 15, 17, 318 Manometer
21, 22, 23, 24, 25, 26, 28, 328 Valve
27 Flowmeter
29 Flow rate adjustment valve
30 Dispenser
31 Sensor
32 Cooler 34 Control circuit
40 Compressor
41 Flow rate adjustment valve
42 Decompression pipe
44 Nozzle
50 Communication control circuit
51 Memory
52 Receiving unit
54 End pressure calculation unit
56 Flow planning unit
58 System control unit
60, 65 Valve control unit
61 Pressure recovery control unit
62 Compressor control unit
63 Supply control unit
64 Dispenser control unit
66 Pressure receiving unit
67 HPU control unit
70, 75 Adsorption column
71, 72, 73, 74 Shutoff valve
76 Pipe
80, 82, 84 Storage device
81 Conversion table
83 Correction table
90 Vent line
92 Return pipe
91, 93 Orifice
100 Control circuit
101 Multi-stage accumulator
102 Hydrogen station
106 Supply unit
110 Adsorption column control valve system
200 FCV
202 Fuel tank
204 On-board device
205 Thermometer
206 Manometer
300 Hydrogen production apparatus
319 Open valve
500 Hydrogen gas supply system

The invention claimed is:

1. A hydrogen gas supply apparatus comprising:
a compressor configured to compress hydrogen gas, wherein the compressor uses a piston and a cylinder to compress the hydrogen gas;
a pressure accumulator configured to accumulate the hydrogen gas compressed by the compressor;
a first adsorption part disposed between the compressor and the pressure accumulator, and configured to include a first adsorbent which adsorbs impurities mixed in the hydrogen gas discharged from the compressor;
a first valve disposed in a first gas supply pipe between the compressor and the first adsorption part;
a second valve disposed in a second gas supply pipe between the first adsorption part and the pressure accumulator;
a return pipe configured to branch from the first gas supply pipe between the first valve and the first adsorption part and connect to an upstream side of the compressor;
a second adsorption part disposed at the return pipe and configured to include a second adsorbent which adsorbs the impurities;
a third valve disposed at an upstream side of the second adsorption part at the return pipe;
a control apparatus configured to control opening and closing of the first valve, the second valve, and the third valve; and
a cylinder leak line connecting the return pipe and the cylinder at an upstream side of a gas inlet of the second adsorption part and a downstream side of the third valve.

2. The hydrogen gas supply apparatus according to claim 1, wherein the control apparatus controls to open the third valve in a state where the first valve and the second valve are controlled to be closed, while an operation of the compressor is stopped.

3. The hydrogen gas supply apparatus according to claim 1, further comprising:
a vent line configured to branch from the first gas supply pipe between the first valve and the first adsorption part; and
a fourth valve disposed in the vent line,
wherein the control apparatus controls, in a state where the first valve and the second valve are controlled to be closed, to open the third valve and the fourth valve.

4. The hydrogen gas supply apparatus according to claim 3, further comprising:
a hydrogen production apparatus configured to supply the hydrogen gas to the compressor;
wherein the control apparatus controls to close the third valve, open the first valve, and supply the hydrogen gas, supplied from the hydrogen production apparatus through the compressor being stopped, to the first adsorption part after a predetermined time has elapsed since the fourth valve was opened.

5. The hydrogen gas supply apparatus according to claim 1, wherein at least one of the first adsorbent and the second adsorbent has an adsorption capacity for sulfur and halogen.

6. A hydrogen gas supply method comprising:
compressing hydrogen gas by a compressor, wherein the compressor uses a piston and a cylinder to compress the hydrogen gas;
accumulating the hydrogen gas compressed by the compressor in a pressure accumulator;
adsorbing impurities mixed in the hydrogen gas discharged from the compressor, to a first absorbent by using a first adsorption part which is disposed between the compressor and the pressure accumulator and includes the first adsorbent;
absorbing, in a state where a first valve disposed in a first gas supply pipe between the compressor and the first adsorption part, and a second valve disposed in a second gas supply pipe between the first adsorption part and the pressure accumulator are controlled to be closed, the impurities to a second adsorbent by using a second adsorption part which is disposed at a return pipe and includes the second adsorbent, by controlling to open a third valve disposed at the return pipe which branches from the first gas supply pipe between the first valve and the first adsorption part and connects to an upstream side of the compressor; and
absorbing impurities generated in the cylinder to the second adsorbent via a cylinder leak line connecting the return pipe and the cylinder at an upstream side of a gas inlet of the second adsorption part and a downstream side of the third valve.

7. A hydrogen gas supply apparatus comprising:
a compressor configured to compress hydrogen gas, and supply the hydrogen gas compressed to a pressure accumulator which accumulates the hydrogen gas, wherein the compressor uses a piston and a cylinder to compress the hydrogen gas;

a first adsorption part disposed between a discharge port of the compressor and the pressure accumulator, and configured to include a first adsorbent for adsorbing impurities in the hydrogen gas discharged from the compressor;

a first valve disposed between the discharge port of the compressor and a gas inlet port of the first adsorption part;

a second valve disposed between a gas outlet port of the first adsorption part and the pressure accumulator;

a return pipe configured to branch from between the first valve and the gas inlet port of the adsorption part and connect to a suction side of the compressor;

a second adsorption part disposed in a middle of the return pipe and configured to include a second adsorbent for adsorbing the impurities in the hydrogen gas discharged from the compressor;

a third valve disposed at between the gas inlet port of the first adsorption part and a gas inlet port of the second adsorption part, being at the middle of the return pipe; and a cylinder leak line connecting the return pipe and the cylinder at an upstream side of a gas inlet of the second adsorption part and a downstream side of the third valve.

8. The hydrogen gas supply apparatus according to claim 7, wherein compressed hydrogen gas in the first adsorption part is flowed into the return pipe due to opening the third valve, and impurities desorbed from the first adsorbent are adsorbed by the second adsorbent in a state where the first adsorption part is blocked from the compressor by the first valve.

9. The hydrogen gas supply apparatus according to claim 7, further comprising:

a vent line configured to branch between the first valve and the gas inlet port of the first adsorption part, and a fourth valve disposed in a middle of the vent line, wherein an inside of the first adsorption part is depressurized from a high pressure to a low pressure, and impurities desorbed from the first adsorbent are discharged to the vent line due to opening the fourth valve.

10. The hydrogen gas supply apparatus according to claim 9, wherein the hydrogen gas is supplied to the compressor from a hydrogen production apparatus, and the hydrogen gas supplied from the hydrogen production apparatus through the compressor being stopped is introduced as a purge gas to the first adsorption part due to opening the first valve and the fourth valve in a state where the compressor is stopped and the inside of the first adsorption part has been depressurized to the low pressure.

11. The hydrogen gas supply apparatus according to claim 7, wherein the impurities are those having been mixed in the compressor.

* * * * *